United States Patent [19]
Kemmler

[11] Patent Number: 5,473,430
[45] Date of Patent: Dec. 5, 1995

[54] METHOD FOR COMPENSATING LIGHT SOURCE WAVELENGTH VARIABILITY IN A ROTATION RATE MEASURING CLOSED-LOOP FIBER OPTIC SAGNAC INTERFEROMETER

[75] Inventor: Manfred Kemmler, Vorstetten, Germany

[73] Assignee: Litef GmbH, Freiburg im Breisgau, Germany

[21] Appl. No.: 195,871

[22] Filed: Feb. 14, 1994

[30] Foreign Application Priority Data

Feb. 17, 1993 [EP] European Pat. Off. ............ 93102494

[51] Int. Cl.⁶ ................................................ G01C 19/72
[52] U.S. Cl. ................................................ 356/350
[58] Field of Search ................................... 356/350

[56] References Cited

FOREIGN PATENT DOCUMENTS

| | | |
|---|---|---|
| 0388929 | 9/1990 | European Pat. Off. . |
| 0427110 | 5/1991 | European Pat. Off. . |
| 0441998 | 8/1991 | European Pat. Off. . |
| 2157425 | 8/1985 | United Kingdom . |

*Primary Examiner*—Vincent P. McGraw
*Attorney, Agent, or Firm*—Elliott N. Kramsky

[57] ABSTRACT

A method for compensating for light source wavelength variation in a fiber optic gyro having a closed reset control loop. The method employs the finding that the voltage range required for a $2\pi$ phase shift in a phase modulator is a function of the wavelength of the gyro light source. The voltage required for affecting the $2\pi$ phase shift in such a gyro is regulated according to the invention and utilized to compensate changes in light source wavelength or scale factor. Phase modulator temperature is also taken into account for precise compensation.

1 Claim, 1 Drawing Sheet

METHOD FOR COMPENSATING LIGHT SOURCE WAVELENGTH VARIABILITY IN A ROTATION RATE MEASURING CLOSED-LOOP FIBER OPTIC SAGNAC INTERFEROMETER

BACKGROUND

1. Field of the Invention

The present invention relates to rotation rate measuring fiber optic Sagnac interferometers of the closed control loop type. More particularly, this invention pertains to a method for compensating light source wavelength variations in such an interferometer.

2. Description of the Prior Art

The scale factor of a fiber optic Sagnac interferometer for measuring rotation rate that includes a closed control loop is wavelength-dependent. Fiber optic gyros that employ digital phase ramp resetting, for example those described in U.S. Pat. Nos. 5,123,741 and 5,351,123, minimize light source wavelength (and, thus, scale factor) variation by both indirect and direct methods. Indirect methods involve light source temperature and injection current stabilization. Direct processes employ supplemental optical components (e.g. gratings, interferometers) to measure the wavelength of the light source. A direct process of the above-described type is disclosed in U.S. Pat. No. 5,311,279. Indirect stabilization involving temperature regulation cannot account for effects due to light source aging. Direct processes, on the other hand, require both supplemental optical components and related modification of associated electronic systems.

SUMMARY AND OBJECTS OF THE INVENTION

It is therefore an object of this invention to provide a method for compensating light source wavelength variations in a closed loop fiber optic rotation rate sensor that does not require supplemental optical components and yet takes account for the effects of aging of the light source.

The foregoing and other objects are addressed by the present invention which provides an improvement in a method for compensating for light source wavelength and resulting scale factor variations in a fiber optic interferometer for measuring rotation rate of the type that includes an associated closed control loop.

In such an interferometer a pair of light beams that originate from a light source are polarized and generated by beam splitting and are modulated in a phase modulator by a signal limited in phase range to $2\pi$. The beams are injected in opposite directions into a fiber coil and subsequently recombined to produce an interference pattern that acts upon a photodetector whose output signal corresponds to the light intensity of the interference pattern to deliver, after analog-to-digital conversion by a digital electronic control system, a setting signal, after digital-to-analog conversion, that compensates for non-reciprocal phase shifts of the light beams at the phase modulator. The analog voltage output by the digital-to-analog converter for producing the setting signal is amplified so that the maximum phase amplitude for the phase modulator corresponds to $2\pi$.

The improved method for compensating for light source wavelength and resulting scale factor variations in an interferometer of the above type is accomplished by computing the wavelength variation of the light source from the control valve for the electronic control system that controls the maximum modulation range at the phase modulator to $2\pi$ and from the temperature at the phase modulator. The scale factor variation resulting form the wavelength variation is then arithmetically compensated by means of such computation.

The preceding and other features and advantages of the present invention will become further apparent from the detailed description that follows. This description is accompanied by a drawing figure in which features of the invention are pointed out and identified by numeral. Numerals of the written description refer to corresponding numerals of the drawing figure. Like numerals refer to like features of the invention throughout both the drawing figure and the written text.

DETAILED DESCRIPTION

Figure 1:
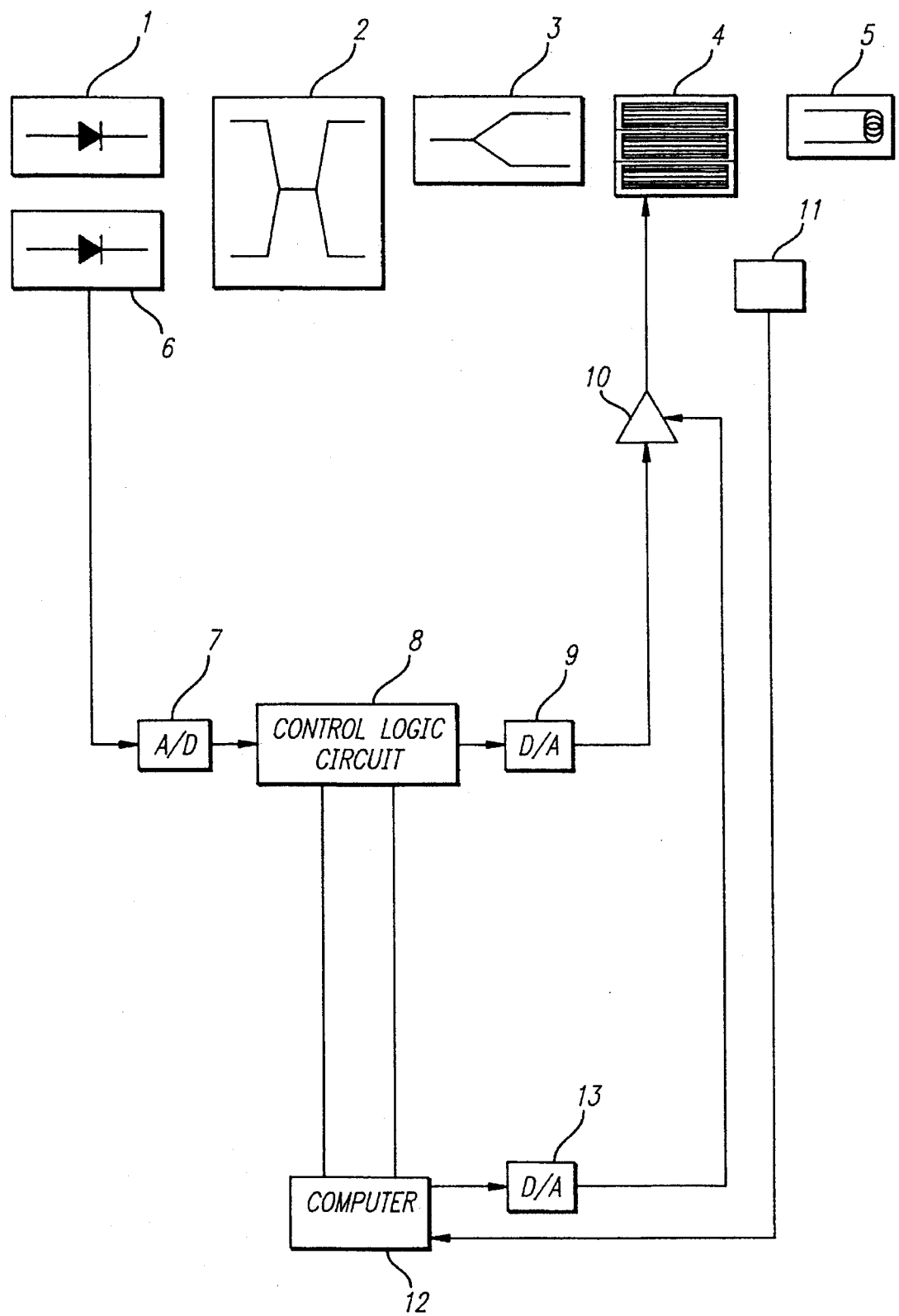
FIG. 1 is a schematic diagram for illustrating the essential elements of a fiber optic gyroscope with closed control loop and digital electronic control system in accordance with the invention.

Turning to the drawings, the Figure is a schematic diagram of the essential elements of a fiber optic gyroscope with closed control loop and digital electronic control system in accordance with the invention. A beam from a light source 1, such as a superluminescent diode, is split into two component beams by means of a coupler 2 and a beamsplitter 3. The two component beams so generated are injected into opposite ends of a fiber coil 5 after passing through a phase modulator 4. After circulation in the fiber coil 5, the two beams are recombined in the beamsplitter 3. Upon again passing through the coupler 2 (in the opposite direction), the resulting interference pattern of the recombined beam is detected by a photodetector 6. The output of the photodetector 6 is digitized by an analog-to-digital converter 7 and directed to a control and evaluation logic circuit 8 that is controlled by a microprocessor 12. This produces a modulation signal composed of a plurality of a signal components that is conducted to a digital-to-analog converter 9 that provides a (re)set signal for the phase modulator 4. Amplification of the analog signal from the digital-to-analog converter 9 is regulated by means of an auxiliary control loop, such as that described in detail in U.S. Pat. No. 5,351,123, discussed above. Such amplification is applied by a variable gain amplifier 10 so that the maximum phase amplitude for the phase modulator 4 is limited to $2\pi$ in all circumstances. In this way, the required gain value is computed in the computer 12 and the gain of the amplifier 10 varied by means of a digital-to-analog converter 13. Since such auxiliary control loop comprises an existing component of the computer 12, the current value of the control voltage is directly available.

The reference voltage value is related to the wavelength of the light source as follows:

$$U_{ref} = (LQW/2*n)/\epsilon_{33} \tag{1}$$

where LQW is the light source wavelength, n is the refractive index of the substrate (e.g. lithium niobate) of the phase modulator 4 and $\epsilon_{33}$ is an electrooptical coefficient.

The values of n and $\epsilon_{33}$ are temperature-dependent. Both the temperature dependence and value must therefore be determined. Temperature dependence may be determined by calibration at a constant wavelength. Temperature can be measured by means of a sensor 11 on the phase modulator 4.

The compensation of scale factor change, $\Delta Sf$, or of light source wavelength change, is governed by the following relationship:

$$\Delta Sf = K_1 * (U_{ref} - K_2 * T) \tag{2}$$

$K_2$ represents the change in amplification with temperature (wavelength constant) while $K_1$ is a proportionality factor. A calibration procedure is required to determine the constants $K_1$ and $K_2$. These are taken into consideration in the software program for scale factor compensation (or compensation of light source wavelength).

An essential advantage of the invention follows from the fact that the control logic circuit 8 that sets the maximum phase amplitude for the phase modulator 4 to $2\pi$ forms a component part of a closed-loop electronic system, such as that described in the earlier-referenced U.S. Pat. No. 5,123, 741 and, more particularly, U.S. Pat. No. 5,351,123. The above-indicated relationship is employed to compensate scale factor change $\Delta Sf$ by wavelength change.

In the invention, compensation of light source wavelength changes in a fiber optic Sagnac interferometer rotation rate sensor with closed control loop is accomplished by computing the change in light source wavelength from the control valve for the electronic control system that regulates the maximum modulation amplitude at the phase modulator 4 to $2\pi$ and the measured temperature. The change in scale factor due to wavelength change is then arithmetically compensated by the result of that computation.

The method is based upon the finding that, in a control loop for phase ramp resetting such as that described in U.S. Pat. Ser. No. 5,123,741 or in U.S. Pat. No. 5,351,123, the voltage range required to generate a phase shift of $2\pi$ by means of the integrated optics phase modulator 4 is related to the wavelength of the light source 1. In fiber optic gyros with closed control loop as described in the referenced patents, the voltage for driving the aforementioned $2\pi$ phase shift is regulated. In the invention, changes in the light source wavelength are compensated by adjusting this voltage value. Since this voltage value is also dependent upon the temperature of the phase modulator 4, such temperature is measured and taken into consideration in generating a signal for compensating for the light source change.

Thus, with the process according to the invention, light source wavelength changes are directly compensated without the addition of optical components and associated electronic systems. The temperature sensor on the phase modulator is, generally, already provided for temperature modelling of the zero point error. Thus, this element of the invention also generally requires no additional expenditure.

Thus it is seen that the present invention provides a method for compensating light source wavelength variations in a closed loop fiber optic rotation rate sensor that does not require supplemental optical components and yet takes the effect of aging of the light source into account.

While this invention has been described with reference to its presently-preferred embodiment, it is not limited thereto. Rather, this invention is limited only insofar as it is defined by the following patent claim and includes within its scope all equivalents thereof.

What is claimed is:

1. In a method for compensating for light source wavelength and resulting scale factor variations in a fiber optic interferometer for measuring rotation rate of the type that includes an associated closed control loop and in which pair of light beams that originate from light emitted by a light source are polarized and generated by beam splitting and are modulated in a phase modulator by a signal limited in phase range to $2\pi$, and in which beams are injected in opposite directions into a fiber coil and subsequently recombined to produce an interference pattern that acts upon a photodetector whose output signal corresponds to the light intensity of the interference pattern to deliver, after analog-to-digital conversion by a digital electronic control system, a setting signal, after digital-to-analog conversion, that compensates for non-reciprocal phase shifts of the light beams at the phase modulator, and in which the analog voltage output by the digital-to-analog converter for producing the setting signal is amplified so that the maximum phase amplitude at the phase modulator corresponds to $2\pi$, the improvement in said method comprising the steps of:

a) computing the wavelength variation of said light source from the control value for the electronic control system that controls the maximum modulation amplitude at the phase modulator to $2\pi$ and from the temperature at said phase modulator,; and then b) arithmetically compensating scale factor variation resulting from said wavelength variation by means of said computation.

\* \* \* \* \*